United States Patent [19]

Nagasaka

[11] Patent Number: 4,536,937

[45] Date of Patent: Aug. 27, 1985

[54] PROCESS OF MANUFACTURING AUTO BUMPERS

[75] Inventor: Yasumasa Nagasaka, Okazaki, Japan

[73] Assignee: Toyota Jidosha Kogyo Kabushiki Kaisha, Toyota, Japan

[21] Appl. No.: 339,635

[22] Filed: Jan. 15, 1982

Related U.S. Application Data

[62] Division of Ser. No. 93,974, Nov. 14, 1979, Pat. No. 4,339,144.

[30] Foreign Application Priority Data

Feb. 21, 1979 [JP] Japan ................................ 54-19386

[51] Int. Cl.³ .............................................. B23P 19/04
[52] U.S. Cl. ...................................... 29/460; 29/527.4
[58] Field of Search ................ 293/120, 121; 264/135, 264/269, 267; 29/527.4, 460; 228/903; 428/553, 551, 621, 624

[56] References Cited

U.S. PATENT DOCUMENTS

| | | | |
|---|---|---|---|
| 3,248,270 | 4/1966 | Laidman et al. | 29/527.4 |
| 3,687,502 | 8/1972 | Loew | 293/120 |
| 3,790,432 | 2/1974 | Fletcher et al. | 264/135 |
| 3,852,150 | 12/1974 | Weller | 293/120 |
| 3,879,516 | 4/1975 | Wolvek | 264/135 |
| 3,888,531 | 6/1975 | Straza et al. | 293/120 |
| 4,087,501 | 5/1978 | Moser | 264/269 |

FOREIGN PATENT DOCUMENTS

| | | | |
|---|---|---|---|
| 1505257 | 6/1969 | Fed. Rep. of Germany | 293/120 |
| 2250908 | 3/1973 | Fed. Rep. of Germany | 293/120 |
| 2754868 | 6/1979 | Fed. Rep. of Germany | 293/120 |
| 54-15945 | 2/1979 | Japan . | |

OTHER PUBLICATIONS

"Preparing Surfaces for Metallizing", *Steel*, Feb. 23, 1948, by Mansell, R.

*Primary Examiner*—Howard N. Goldberg
*Assistant Examiner*—Timothy V. Eley
*Attorney, Agent, or Firm*—Oblon, Fisher, Spivak, McClelland & Maier

[57] ABSTRACT

The invention represents an auto bumper with an exterior part which can be seen from the outside. The exterior part is made of stainless steel plate and an interior part is made of fiber reinforced plastics via a layer of aluminum or aluminum alloy.

1 Claim, 12 Drawing Figures

PROCESS OF MANUFACTURING AUTO BUMPERS

This is a division of application Ser. No. 093,974 filed Nov. 14, 1979, now U.S. Pat. No. 4,339,144.

BACKGROUND OF THE INVENTION

1. Field of the Invention:

The present invention relates to an auto bumper and its manufacturing process.

2. Description of the Prior Art:

An auto bumper is a piece attached to the front and rear of a car to serve as a cushion in a collision, thereby protecting the auto body and the driver. Particularly in the case of a passenger car, the aesthetic requirement of the bumper, which appears on the outside of the vehicle, is stressed in addition to the above requirement.

The conventional auto bumpers can be broadly classified into:

1. Energy absorbing types such as the stable type consisting of (a) a steel bumper plus a shock absorber (Menasco type) or (b) a polyurethane bumper, and the non-stable type consisting of a bumper made of fiber reinforced plastics (FRP) which can absorb the energy of destruction itself.
2. Ordinary types such as a steel bumper alone.

The last-mentioned steel bumper, which has been popularly used, has drawbacks in that it is heavy, thereby increasing the vehicle inertia. Moreover, since it is fitted at the front and rear ends of a vehicle, it is unfavorable for controlling longitudinal vibrations of the vehicle, i.e., so-called pitching. By contrast, the polyurethane bumper is light and can restore itself after a collision, but it cannot be given a metallic lustre and it is thus limited in design versatility. Meanwhile the FRP bumper, which is usually metallic-coated or metallized for aesthetic reasons, defies a treatment to give it a durable metallic lustre. On the other hand, the conventional composite bumper of stainless steel and FRP lacks adequate adhesion of the two elements at the interface thereof.

It is not always necessary that stainless steel and FRP be bonded with each other from a functional point of view, but a good adhesion between the two elements provides a pleasant feel of structural integrity, thereby enhancing the commercial value of the bumper and contributing to its rigidity as well as reducing its weight. Thus, good adhesion has been one of the important requirements in a bumper of this kind.

SUMMARY OF THE INVENTION

The primary object of the present invention is to provide an auto bumper consisting of a steel plate characterized by metallic lustre and good appearance, and of FRP characterized by lightness.

Another object of the present invention is to provide an auto bumper consisting of a firmly integrated structure of stainless steel with FRP.

Still another object of the present invention is to offer a process for manufacturing an auto bumper consisting of an integrated structure of stainless steel with FRP.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

The present invention relates to an auto bumper characterized by the outward-visible part of it being constructed of stainless steel and the inside part of it being constructed of FRP via a layer of aluminum or aluminum alloy, and its process of manufacture.

For the fiber reinforced plastics (FRP) to be used in the present invention, conventional reinforcing fibers such as glass or carbon fibers may be used, short or long fiber or woven textile fibers being selected depending on the purpose of application.

Conventional resins such as unsaturated polyester resin, epoxy resin or vinylester resin may be used.

As stainless steel for the present invention, steels with various compositions may be available; 18 to 8 stainless steel and 18Cr stainless steel are especially preferable. The thickness of the stainless steel plate can be arbitrarily selected, preferably 0.2–0.8 mm. The desirable thickness (or weight) ratio of stainless steel and FRP is 1:5 to 1:20.

The layer of aluminum or aluminum alloy may be formed by the following processes: for example, shot-peening of the boundary surface of the stainless steel with FRP may be performed, followed by metallization through flame spraying with aluminum or aluminum alloy; a process of frictional deposition may be used; or a process of shot-blasting with alumina particles may be used. If a method of caulking FRP at both edges of stainless steel plate is coupled with one of the above processes, a high bond strength between the two elements will be achieved.

The thickness of the aluminum or aluminum alloy layer can be changed to suit the purpose, the preferable range being $0.01\mu$ to $500\mu$. Aluminum alloy available is for instance from the Al-Cu series (order of No. 2000).

The following are specific examples illustrating the present invention in more detail.

EXAMPLE 1

Figure 1A:
FIG. 1a–1g are sectional views illustrating the steps of one manufacturing process according to the present invention.
Figure 1B:
Figure 1C:
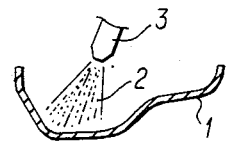
Figure 1D:
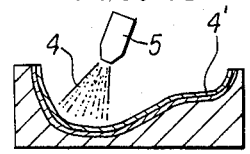
Figure 1E:
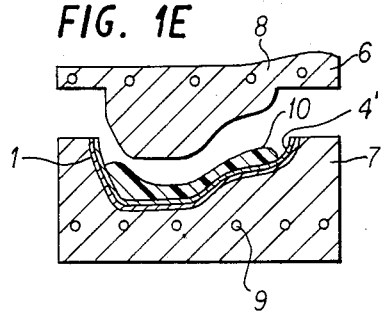
Figure 1F:

As illustrated in FIG. 1, a flat stainless steel plate 1 which is to serve as the outer shell (FIG. 1a) is press-molded to a specified bumper configuration (FIG. 1b). Next, the inner surface of the plate 1 to be joined to FRP is coarsened by shot-peening with shots 2 blasted against it by the peening device 3 (FIG. 1c). Then the coarsened surface is metallized by flame-spraying with aluminum powder 4 by means of the flame sprayer 5, thereby forming a metallized film 4' (FIG. 1d). The film 4' is preferably $20\mu$–$500\mu$ in thickness. Next the bumper-shaped steel plate 1 is placed in the bottom mold 7 of the FRP-forming matched metal die with the metallized film 4' on top, and the film 4' is charged with FRP material 10, for example so-called "pre-pregmat" (glass fiber content: 15 to 85%), that is, glass fibers impregnated with unsaturated polyester resin and a curing agent (FIG. 1e). Thereupon, the top mold 6 of the die is lowered for integration of steel 1 and FRP 10 through heat and press molding. With burrs removed, the integrated piece of finished to a bumper A (FIG. 1f). Heating of the molds 6 and 7 of the die is carried out by the internal heaters 8, 9. The thickness of the stainless steel used in this Example is preferably 0.4–0.8 mm and the ratio of thickness between the stainless steel plate and FRP is in the range of 1:5 to 1:20.

In the above process, the lamination of the FRP coat may be done directly by a hand lay-up method instead of using the matched metal die.

Formation of an FRP coat may be done by the conventional method, or by preparing a formed FRP bumper separately and bonding the stainless steel plate 1 thereto, after shot-peening, with the use of an adhesive, etc. The method to be selected may be done by considering the quantity and efficiency of production.

Figure 1G:
Figure 2:
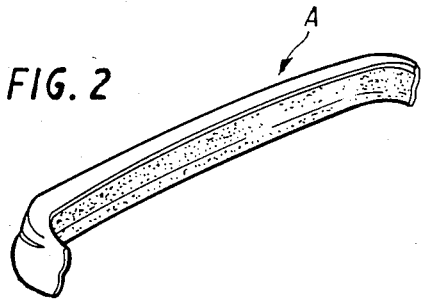
FIG. 2 is an oblique view showing a bumper according to the present invention.

If desired, the stainless steel plate 1 of a finished bumper A may be subjected to hemming to increase the bonding strength of the above two pieces (FIG. 1g). An oblique view of the finished bumper A is shown in FIG. 2.

EXAMPLE 2

Figure 3A:
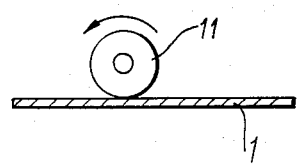
FIGS. 3a–3d are sectional views illustrating the steps of another manufacturing process according to the present invention.

In this example, as illustrated in FIG. 3a, an aluminum or aluminum alloy layer is formed through frictional deposition by strongly pressing a rotating body 11 made of aluminum or aluminum alloy against the FRP-forming side of a flat stainless steel plate 1 which has been degreased. In this case, a wide, positive deposition effect will be achieved if the circumferential speed of the rotating body 11 on the frictional surface is set at from 0.1 m/sec to 100 m/sec and the pressure applied to the rotating body is set at from 10 g/cm to 10 kg/cm to the thickness of the rotating body, depending on the thickness of the steel plate. The thickness of aluminum alloy deposited on the stainless steel is in the range of 0.01–10$\mu$.

Figure 3B:
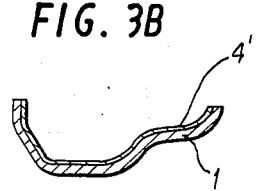
Figure 3C:
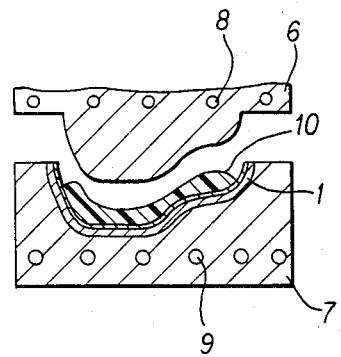
Figure 3D:
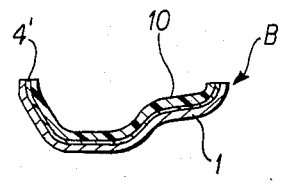

Next, the stainless steel plate 1 which has been subjected to frictional treatment with aluminum is pressmolded to a bumper configuration (FIG. 3b). The obtained bumper-shaped stainless steel plate 1 is degreased on the area intended for FRP deposition and is then placed in the bottom mold 7 of the FRP-forming metal die with that area positioned on top. FRP material 10 (same as in Example 1) is then set thereon and the top mold 6 is lowered for pressurization. Heat-hardening is done by means of the heaters 8, 9 (FIG. 3c). Then a mold-release operation is carried out followed by trimming to obtain a bumper B (FIG. 3d). In this case also, hemming may be applied as illustrated in FIG. 1g of Example 1.

EXAMPLE 3

In this example, the same process as employed in Example 1 is used to manufacture a bumper C except that alumina particles are used for shot peening. In this case the step of flame-spraying of aluminum may be omitted.

Comparison of the bonding strength of the stainless steel FRP material used to make bumpers D and E in terms of shear strength is made with those of the bumper A which is prepared by the method of Example 1 and the conventional bumpers. The bumper D is obtained by joining FRP material to a steel plate which is only degreased with a solvent and the bumper E obtained by joining FRP to a steel plate which is treated with a sander. The result of the comparison is indicated in the following table.

TABLE

| | Shear Strength of Bumper | | |
| | Bumper | | |
| Stainless steel | A Aluminum-deposited | D Solvent-degreased | E Sander-treated |
| --- | --- | --- | --- |
| 18-8 | more than 156 kg/cm$^2$ | 77 kg/cm$^2$ | 138 kg/cm$^2$ |
| 18Cr | more than 140 kg/cm$^2$ | 97 kg/cm$^2$ | 117 kg/cm$^2$ |

The bumpers B and C obtained in Examples 2 and 3 exhibit as high a bonding strength as the bumper A.

As seen from the above description, the bumper according to the present invention, which consists of a lustrous steel plate on the outside and a well-cushioning, light FRP on the inside, both elements being strongly bonded together, can serve as a long-standing, integral light-weight bumper. Stainless steel is expensive, but its consumption can be reduced according to the present invention, yielding a very economical bumper.

Especially when the method illustrated in the Example 2 is used, the pre-treatment costs can be reduced to yield a low-cost product.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for forming an auto bumper comprising:
   forming an outer visible part comprising a stainless steel plate having a first thickness;
   forming a layer of one from the group consisting of aluminum and aluminum alloy bonded to one side surface of said plate, said layer being bonded to said plate by frictional deposition on substantially said entire one side surface, said layer having a second thickness smaller than said first thickness; and
   forming an inner part comprising a fiber reinforced plastic material bonded to said layer by heating and pressurizing said fiber reinforced plastic material to directly adhesively bond said layer to said fiber reinforced plastic material,
   whereby said layer is sandwiched between and bonds said inner and outer parts to form a unitary bumper having low mass and high lustre.

* * * * *